(12) United States Patent
Lee et al.

(10) Patent No.: US 12,072,909 B2
(45) Date of Patent: Aug. 27, 2024

(54) METHOD AND DEVICE FOR DATA SYNCHRONIZATION, STORAGE MEDIUM AND ELECTRONIC DEVICE

(71) Applicant: CHANGXIN MEMORY TECHNOLOGIES, INC., Hefei (CN)

(72) Inventors: Chung-Hsiung Lee, Hefei (CN); Kewu Sun, Hefei (CN); Lu Yu, Hefei (CN); Po-Hao Wang, Hefei (CN); Delong Huang, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 64 days.

(21) Appl. No.: 17/898,624

(22) Filed: Aug. 30, 2022

(65) Prior Publication Data

US 2023/0281220 A1 Sep. 7, 2023

Related U.S. Application Data

(63) Continuation of application No. PCT/CN2022/087608, filed on Apr. 19, 2022.

(30) Foreign Application Priority Data

Mar. 4, 2022 (CN) .......................... 202210210797.2

(51) Int. Cl.
*G06F 16/27* (2019.01)
*G06F 16/174* (2019.01)
*G06F 16/22* (2019.01)

(52) U.S. Cl.
CPC .......... *G06F 16/27* (2019.01); *G06F 16/1756* (2019.01); *G06F 16/2282* (2019.01)

(58) Field of Classification Search
None
See application file for complete search history.

(56) References Cited

U.S. PATENT DOCUMENTS

| 7,734,828 | B2 * | 6/2010 | Prasad | G06F 16/27 |
| | | | | 709/248 |
| 8,346,972 | B2 * | 1/2013 | Prasad | G06F 16/27 |
| | | | | 709/248 |

(Continued)

FOREIGN PATENT DOCUMENTS

| CN | 105426440 A | 3/2016 |
| CN | 109359160 A | 2/2019 |

(Continued)

*Primary Examiner* — Kim T Nguyen
(74) *Attorney, Agent, or Firm* — Kilpatrick Townsend & Stockton LLP

(57) ABSTRACT

A method and device for data synchronization, a storage medium and an electronic device are provided. The method for data synchronization includes operations as follows. Synchronization configuration information for data to be synchronized is determined, and the synchronization configuration information at least includes a data identification of the data to be synchronized and a source data table identification of a source data table where the data to be synchronized is located. A source database is queried based on the source data table identification to obtain a target source data table where the data to be synchronized is located. A field identification of the data to be synchronized is determined from the target source data table based on the data identification. A target data table is constructed based on the field identification, and the data to be synchronized is synchronized into the target data table.

20 Claims, 16 Drawing Sheets

(56) References Cited

U.S. PATENT DOCUMENTS

| | | | | |
|---|---|---|---|---|
| 9,037,751 | B2* | 5/2015 | Prasad | G06F 16/27 |
| | | | | 707/610 |
| 10,810,210 | B2* | 10/2020 | Choudhury | G06F 16/2379 |
| 2006/0136443 | A1* | 6/2006 | Dulay | G06F 16/275 |
| 2008/0313355 | A1* | 12/2008 | Prasad | G06F 16/27 |
| | | | | 709/248 |
| 2010/0161552 | A1* | 6/2010 | Murarasu | G06F 16/283 |
| | | | | 707/610 |
| 2010/0205324 | A1* | 8/2010 | Prasad | G06F 16/27 |
| | | | | 707/610 |
| 2013/0085992 | A1* | 4/2013 | Prasad | G06F 16/27 |
| | | | | 707/634 |
| 2014/0229435 | A1* | 8/2014 | Palivatkel | G06F 16/252 |
| | | | | 707/620 |
| 2018/0260435 | A1 | 9/2018 | Xu | |

FOREIGN PATENT DOCUMENTS

| | | |
|---|---|---|
| CN | 109885581 A | 6/2019 |
| CN | 111104450 A | 5/2020 |

\* cited by examiner

METHOD AND DEVICE FOR DATA SYNCHRONIZATION, STORAGE MEDIUM AND ELECTRONIC DEVICE

CROSS-REFERENCE TO RELATED APPLICATION

This application is a continuation of International Patent Application No. PCT/CN2022/087608, filed on Apr. 19, 2022, which claims the priority to a Chinese patent application No. 20.2210210797.2, filed on Mar. 4, 2022. The disclosure of the above reference applications are hereby incorporated by reference in their entireties.

BACKGROUND

A semiconductor company includes a large number of operating information technology (IT) systems. The data of these systems are completely independent and cannot be accessed mutually, and types and formats of the data of the systems are different from each other. When integrating the data, the IT departments clean, integrate and convert the database tables of the systems, and then load the database tables into the data center for subsequent analysis.

When processing the data tables, the developers develop the data tables one by one, and compile the data table into a binary program or convert the data table into the script after development and debugging, and then deploy the data table online. The data to be synchronized is preprocessed by the developed program or the script and then synchronized into the data center, which is heavy and tedious development workload. Therefore, the efficiency of data synchronization in various systems is low at present.

SUMMARY

The present disclosure relates to the technical field of data processing, and particularly to a method and device for data synchronization, a storage medium and an electronic device.

A first aspect of the present disclosure provides a method for data synchronization. The method includes operations as follows. Synchronization configuration information for data to be synchronized is determined, and the synchronization configuration information at least includes a data identification of the data to be synchronized and a source data table identification of a source data table where the data to be synchronized is located. A source database is queried based on the source data table identification, to obtain a target source data table where the data to be synchronized is located, and the source database includes a plurality of source data tables. A field identification of the data to be synchronized is determined from the target source data table based on the data identification. A target data table is constructed based on the field identification, and the data to be synchronized is synchronized into the target data table.

A second aspect of the present disclosure provides a method for data synchronization for synchronizing a plurality of sets of data to be synchronized. The method includes operations as follows. After a first target data table of first data to be synchronized is generated, triggering data corresponding to the first data to be synchronized is determined according to a pre-configured data synchronization model, and the data synchronization model is configured to indicate a mutual triggering order among a plurality of sets of synchronous data. With taking the triggering data as new data to be synchronized, data synchronization is performed on the new data to be synchronized based on the method for data synchronization described above.

A third aspect of the present disclosure provides a device for data synchronization. The device includes a first determining circuit, a query circuit, a second determining circuit, and a first synchronization circuit. The first determining circuit is configured to determine synchronization configuration information for data to be synchronized. The synchronization configuration information at least includes a data identification of the data to be synchronized and a source data table identification of a source data table where the data to be synchronized is located. The query circuit is configured to query a source database based on the source data table identification to obtain a target source data table where the data to be synchronized is located, and the source database includes a plurality of source data tables. The second determining circuit is configured to determine a field identification of the data to be synchronized from the target source data table based on the data identification. The device first synchronization circuit is configured to construct a target data table based on the field identification and synchronize the data to be synchronized into the target data table.

A fourth aspect of the present disclosure provides a device for data synchronization for synchronizing a plurality of sets of data to be synchronized. The device includes a third determining circuit and a second synchronization circuit. The third determining circuit is configured to, after first target data table of first data to be synchronized is generated, determine triggering data corresponding to the first data to be synchronized according to a pre-configured data synchronization model. The data synchronization model is configured to indicate a mutual triggering order among a plurality of sets of synchronous data. The second synchronization circuit is configured to, with taking the triggering data as new data to be synchronized, perform data synchronization on the new data to be synchronized based on the method for data synchronization described above.

A fifth aspect of the present disclosure provides a non-transitory computer readable storage medium. The computer-readable storage medium having stored thereon a computer program that, when being executed by a processor, implements any method for data synchronization described above.

A sixth aspect of the present disclosure provides an electronic device. The device includes a processor and a memory for storing processor-executable instructions. A processor is configured to perform any method for data synchronization described above by executing the executable instructions.

It should be understood that the above general descriptions and the following detailed descriptions are only exemplary and explanatory and not intended to limit the present disclosure.

BRIEF DESCRIPTION OF THE DRAWINGS

The accompanying drawings, which are incorporated and form a part of the present disclosure, illustrate embodiments of the present disclosure and, together with this specification, serve to explain the principles of the present disclosure. It is apparent that the drawings described below only illustrate some embodiments of the disclosure, Other drawings may also be obtained by those skilled in the art according to these drawings without creative work.

DETAILED DESCRIPTION

Figure 1:
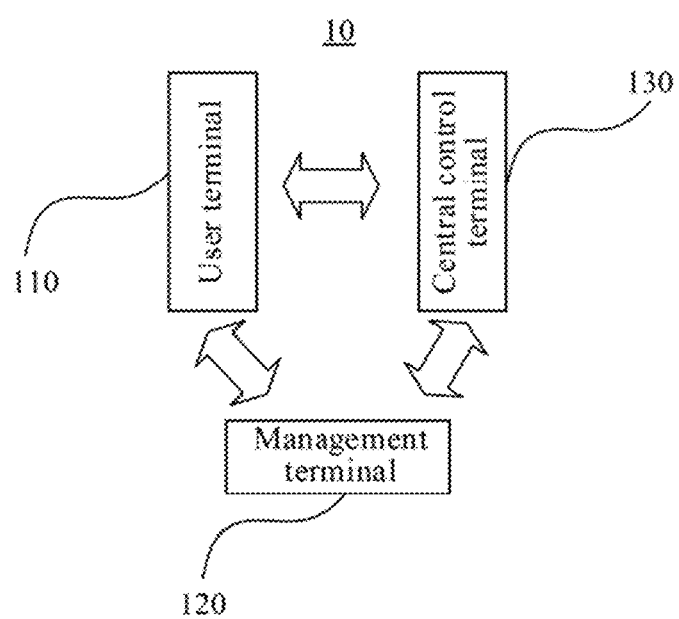
FIG. 1 is a schematic structural diagram of each terminal in a system for data synchronization in the present exemplary embodiment.

Exemplary embodiments are described fully here with reference to the accompanying drawings. However exemplary embodiments can be implemented in a variety of forms and should not be construed as being limited to the examples set forth herein. Rather these embodiments are provided to make the present disclosure more comprehensive and complete, and the idea of exemplary embodiments will be fully communicated to those skilled in the art. The same reference numerals in the drawings represent the same or similar structures, so their detailed description will be omitted.

Although relative terms, such as "on" and "below" are used in this specification to describe the relative relationship between one component and another component with reference numerals, these terms are used in this specification for convenience only, such as according to the directions of the examples described in the drawings. It should be understood that if the device with the reference numeral is turned upside down, the component described to be "on" may become the component described to be "below". Other relative terms, such as "high", "low", "top", "bottom", "left" and "right", have similar meanings. When a structure is "on" other structure, it may mean that a structure is integrally formed on the other structure, or that a structure is "directly" arranged on the other structure, or that a structure is "indirectly" arranged on the other structure through another structure.

The terms "a", "one", "the" are used to indicate the existence of one or more elements/component distinctions/etc. The terms "include" and "have" are used to mean open-ended inclusion and to mean that there may be other elements/component distinctions/etc. in addition to the listed elements/component distinctions/etc.

In related technologies, there are a large number of various operational IT systems in semiconductor companies. The data of these systems are completely independent and cannot be accessed mutually, and types and formats of the data of the systems are different from each other. When integrating the data, the IT departments clean, integrate and convert the database tables of the systems, and then load the database tables into the data center for subsequent analysis.

When processing the data tables, the developers develop the data tables one by one, and compile the data table into a binary program or convert the data table into the script after development and debugging, and then deploy the data table online. The data to be synchronized is preprocessed by the developed program or the script and then synchronized into the data center, which is heavy and tedious development workload, Therefore, the efficiency of data synchronization in various systems is low at present.

In view of the above problems, with the method for data synchronization according to the embodiment of the present disclosure, the synchronization configuration information for the data to be synchronized is firstly determined, and then the source database is queried based on the source data table identification, to obtain the target source data table where the data to be synchronized is located. The field identification of the data to be synchronized is determined from the target source data table based on the data identification. Finally, after the target data table is constructed based on the field identification, the data to be synchronized is synchronized into the target data table. That is, in the embodiment of the present disclosure, the target data table matching with the data to be synchronized is constructed automatically and directly based on the field identification of the data to be synchronized in the source data table, then the data to be synchronized can be directly synchronized into the target data table, which is convenient and fast. In this way, only the synchronization configuration information is adjusted, while there is no need for the staff to develop synchronization programs or synchronization scripts corresponding to data tables one by one according to the data tables, which reduces the development workload greatly Thereby, the technical problem of low efficiency of data synchronization in various systems in the traditional methods is solved, and the technical effect of improving the efficiency of data synchronization is achieved.

An application environment of the method for data synchronization provided by the embodiment of the present disclosure is briefly introduced below.

Figure 2:
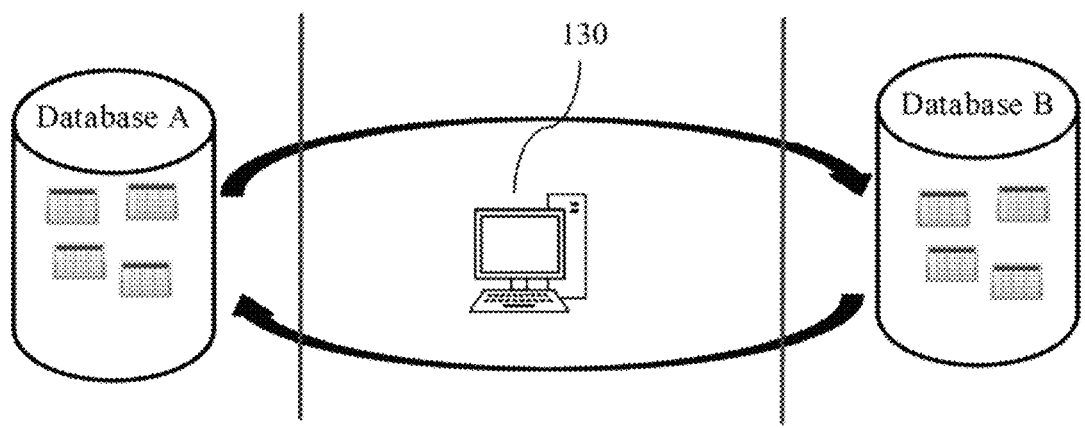
FIG. 2 is an schematic interaction diagram of performing data synchronization in a method for data synchronization in the present exemplary embodiment.

Referring to FIG. 1, the method for data synchronization provided by the embodiment of the present disclosure is applied to a system 10 for data synchronization. The system 10 for data synchronization at least includes a number of user terminals 110, a management terminal 120 and a central control terminal 130. The user terminal 110 refers to a device or system corresponding to the internal operation of each independent department, such as a production department, an operation and maintenance department and a logistics department. The user terminal 110 stores the data generated during the internal operation of the independent department, and does not share data with other independent departments. The management terminal 120 refers to a device or a system for overall managing all the user terminals 110, such as sharing the information and distributing the data synchronization configuration information and the like. It is to be noted that the management terminal 120 may be an independent device or system different from each user terminal 110 and the central control terminal 130, or may be any user terminal 110 or the central control terminal 130, which is used as an interface by the corresponding manager to upload shared information or synchronization configuration information, etc. to the central control terminal 130. The central control terminal 130 is mainly used for sharing data in each user terminal 110. For example, in FIG. 2, the data A in database A in the user terminal A is synchronized into database B in the user terminal B through the central control terminal 130.

Figure 3:
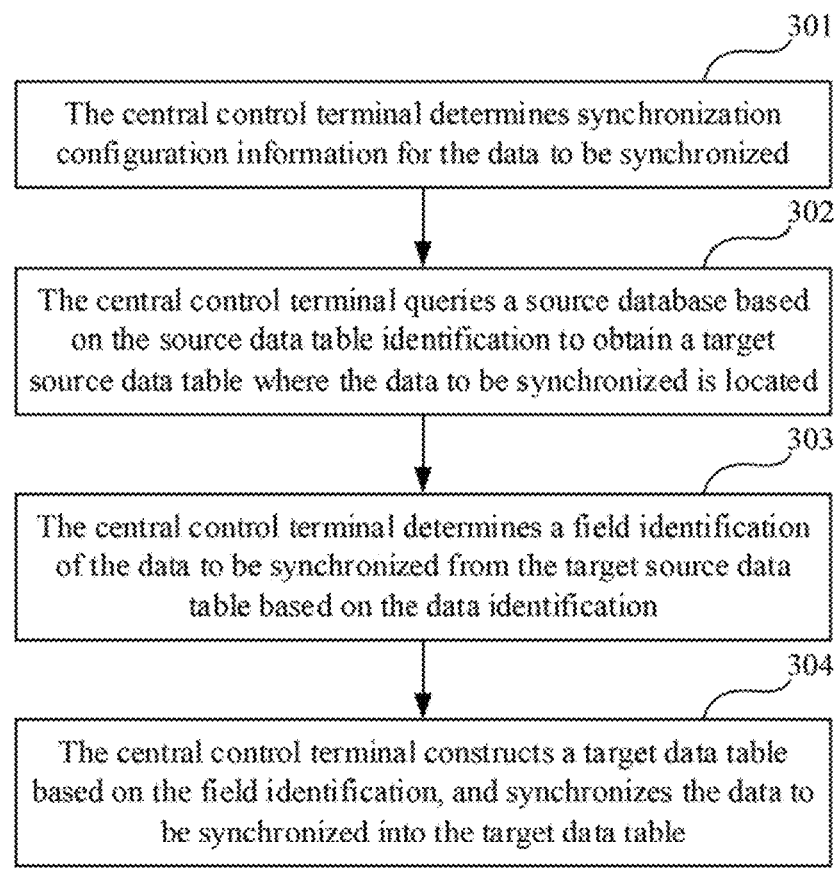
FIG. 3 is a flowchart of synchronizing data to be synchronized into a target data table in a method for data synchronization in the present exemplary embodiment.

With taking the central control terminal 130 as an execution body in the following descriptions, the method for data synchronization is applied to the central control terminal 130 to synchronize data in the user terminal A into the user terminal B. Referring to FIG. 3, a method for data synchronization provided by an embodiment of the present disclosure includes operations 301 to 304 as follows.

At operation 301, the central control terminal determines synchronization configuration information for data to be synchronized.

The synchronization configuration information at least includes a data identification of the data to be synchronized and a source data table identification of a source data table where the data to be synchronized is located. The data identification is used to distinguish the data, and the data identification can be for example any one or any combination of a table header, a row number, a column number, etc., which is not limited in the embodiment. The source data table refers to a data table in which the data to be synchronized is initially stored. For example, data in data table A is synchronized into data table B, that is, the data table A is the source data table. The source data table identification is used for distinguishing data tables. For example, the source data table identification can be, for example, a table name, a number, etc. The present embodiment is not exhaustive.

At operation 302, the central control terminal queries a source database based on the source data table identification to obtain a target source data table where the data to be synchronized is located.

The source database includes multiple source data tables, and different source data tables may be stored in different user terminals. For example, source data table 1 is stored in user terminal 1 corresponding to the production department, source data table 2 is stored in user terminal 2 corresponding to the operation and maintenance department, and source data table 3 is stored in user terminal 3 corresponding to the logistics department. The central control terminal constructs location correspondences of all the source data tables in advance, for example, the following table 1.

TABLE 1

| Serial number | Source data table identification | Storage location |
| --- | --- | --- |
| 1 | Source data table 1 | User terminal 1 |
| 2 | Source data table 2 | User terminal 2 |
| 3 | Source data table 3 | User terminal 3 |
| ... | ... | ... |

For example, if the source data table identification is 1, the target source data table corresponding to the source data table identification is the source data table 1, which is stored in the user terminal 1.

At operation 303, the central control terminal determines field identification of the data to be synchronized from the target source data table based on the data identification.

The fields refer to variables associated with objects or classes in the data table, and each field includes thematic information. For example, fields in the "production work order" table include "construction period", "yield", "responsible person", etc. The field identification is used to distinguish different fields in the source data table. After obtaining the data identification, the central control terminal queries the target source data table based on the data identification, for example, the data identification is the fifth row to the twentieth row, the target source data table is source data table 1, and the central control terminal queries the fifth row to the twentieth row in the source data table 1, so as to determine the field identification of the data in this interval, for example, "Construction period" and "yield".

At operation 304, the central control terminal constructs a target data table based on the field identification, and synchronizes the data to be synchronized into the target data table.

The operation that the central control terminal constructs a target data table based on the field identification obtained in the above operation includes but is not limited to the following two ways. In the first way, the central control terminal reconstructs a new empty table including only the field identifications "Construction period" and "yield" as the target data table. In the second way, the central control terminal adds fields "Construction period" and "yield" on the basis of a constructed initial data table to form a target data table including new fields. After constructing the target data table, the central control terminal can synchronize the data to be synchronized in the source data table into the corresponding fields of the target data table according to a certain period, a certain number of batches, or completely and instantly, so as to implement the synchronization of the data to be synchronized.

According to the embodiment of the present disclosure, with the method for data synchronization according to the embodiment of the present disclosure, the synchronization configuration information for the data to be synchronized is firstly determined, and then the source database is queried based on the source data table identification, to obtain the target source data table where the data to be synchronized is located. The field identification of the data to be synchronized is determined from the target source data table based on the data identification. Finally, after the target data table is constructed based on the field identification, the data to be synchronized is synchronized into the target data table. That is, in the embodiment of the present disclosure, the target data table matching with the data to be synchronized is constructed automatically and directly based on the field identification of the data to be synchronized in the source data table, then the data to be synchronized can be directly synchronized into the target data table, which is convenient and fast. In this way, only the synchronization configuration information is adjusted, while there is no need for the staff to develop synchronization programs or synchronization scripts corresponding to data tables one by one according to the data tables, which reduces the development workload greatly. Thereby, the technical problem of low efficiency of data synchronization in various systems in the traditional methods is solved, and the technical effect of improving the efficiency of data synchronization is achieved.

Figure 4:
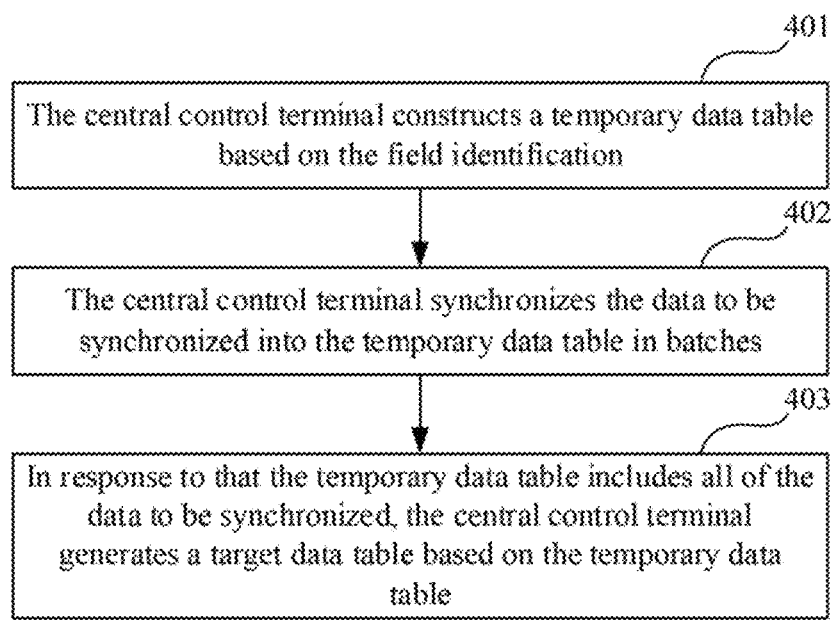
FIG. 4 is a flowchart of generating a target data table in a method for data synchronization in the present exemplary embodiment.

Referring to FIG. 4, in an optional embodiment of the present disclosure, operation 304 that the central control terminal constructs a target data table based on the field identification and synchronizes the data to be synchronized into the target data table, including the following operations 401 to 403.

At operation 401, the central control terminal constructs a temporary data table based on the field identification.

After obtaining the field identification of the data to be synchronized in the target source data table, the central control terminal reconstructs a new empty table including the field identification as a temporary data table. The temporary data table can be constructed in a target library where the target data table is located, and can also be constructed in other storage spaces of the central control terminal, which is not limited in the embodiment. Also referring to FIG. 5 for example, the central control terminal queries the source database and determines that the target source data table is the source data table 1, and then constructs a temporary data table in the target library based on the field identification in the source data table 1.

At operation 402, the central control terminal synchronizes the data to be synchronized into the temporary data table in batches.

Figure 5:
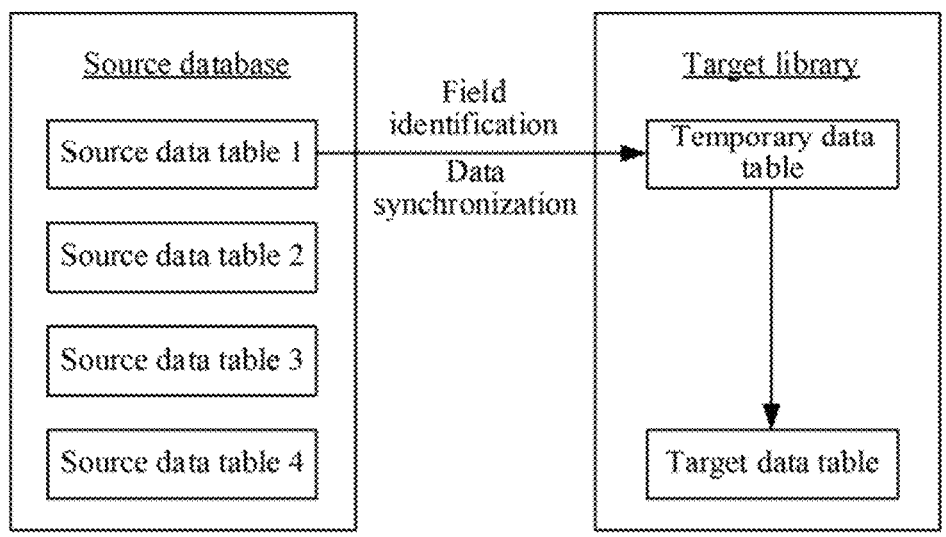
FIG. 5 is a schematic diagram of data interaction in a method for data synchronization in the present exemplary embodiment.

Also referring to FIG. 5, the central control terminal can sequentially synchronize the data to be synchronized from the target source data table (that is, the source data table 1) into the temporary data table according to a period, a number of batches, or instantly. In practical, the central control terminal can also, according to categories of the fields, sequentially synchronize the data to be synchronized into fields of the temporary data table corresponding to the categories. For example, the central control terminal synchronizes data in the field "Construction period" first, and then synchronizes the data in the field "yield" after completing synchronization of the data in the field "Construction period", which is not limited in the embodiment.

At operation 403, in response to that the temporary data table includes all data in the data to be synchronized, the central control terminal generates a target data table based on the temporary data table.

In a process of synchronization, data synchronization may be interrupted due to network disconnection, system instability, source database shutdown, etc. Only when the temporary data table contains all the data to be synchronized, it indicates that the current synchronization is completed. Also referring to FIG. 5, in response to the temporary data table includes all the data in the data to be synchronized, the central control terminal generates a target data table based on the data in the temporary data table and stores the target data table in the target library for subsequent analysis.

In the embodiment of the present disclosure, a temporary data table is constructed firstly based on the field identification, and the data to be synchronized is synchronized into the temporary data table in batches, and a target data table is generated based on the temporary data table only after all the data in the data to be synchronized are included in the temporary data table. In this way, the interruption of data synchronization caused by network disconnection, system instability, source database shutdown and the like can be effectively avoided, thereby avoiding a synchronization process of other synchronized data in the target data table from being affected by crash of the target data table due to the interruption. By constructing a temporary data table for different data to be synchronized, pieces of data to be synchronized is synchronized independently, thereby greatly reducing the risk of synchronization interruption and further improving the stability and reliability of data synchronization in the embodiment of the present disclosure.

Figure 6:
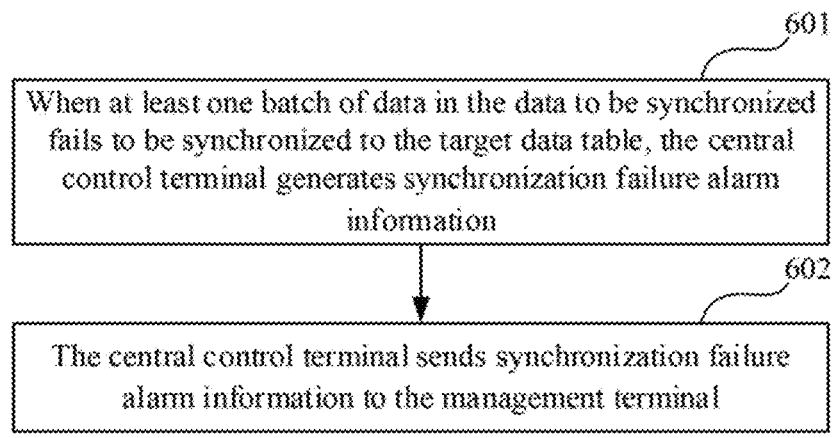
FIG. 6 is a flowchart of generating synchronization failure alarm information in a method for data synchronization in the present exemplary embodiment.

Referring to FIG. 6, in an optional embodiment of the present disclosure, the method for data synchronization further includes operations 601 to 602.

At operation 601, in response to at least one batch of data in the data to be synchronized fails to be synchronized into the target data table, the central control terminal generates synchronization failure alarm information.

In a process of synchronization, the central control terminal monitors the process of synchronization in real time, and generates synchronization failure alarm information as long as any data fails to be synchronized. The synchronization failure alarm information can be reminder information that only provides a warning function, and can also include other information such as data identification, field identification or a data location of synchronization failure, for facilitating quick positing by the management terminal.

In a particular embodiment, the central control terminal can also set a threshold of the number of failures. After one piece of data to be synchronized is failed to be synchronized, a restart mechanism is started to synchronize the data which is failed to be synchronized again. The number of restarting the data which is failed to be synchronized is counted, and the synchronization failure alarm information is generated when the current number of failures is greater than or equal to the threshold of the number of failures, thereby improving a success probability of the data synchronization and further improving the reliability of data synchronization provided by the embodiment of the present disclosure.

At operation 602, the central control terminal sends synchronization failure alarm information to the management terminal.

The central control terminal generates synchronization failure alarm information after synchronization is failed, and sends the alarm information to the management to warn the management terminal that the current synchronization is failed, so that the staff can handle the synchronization in time and further improve the reliability of data synchronization of the embodiment of the present disclosure.

Figure 7:
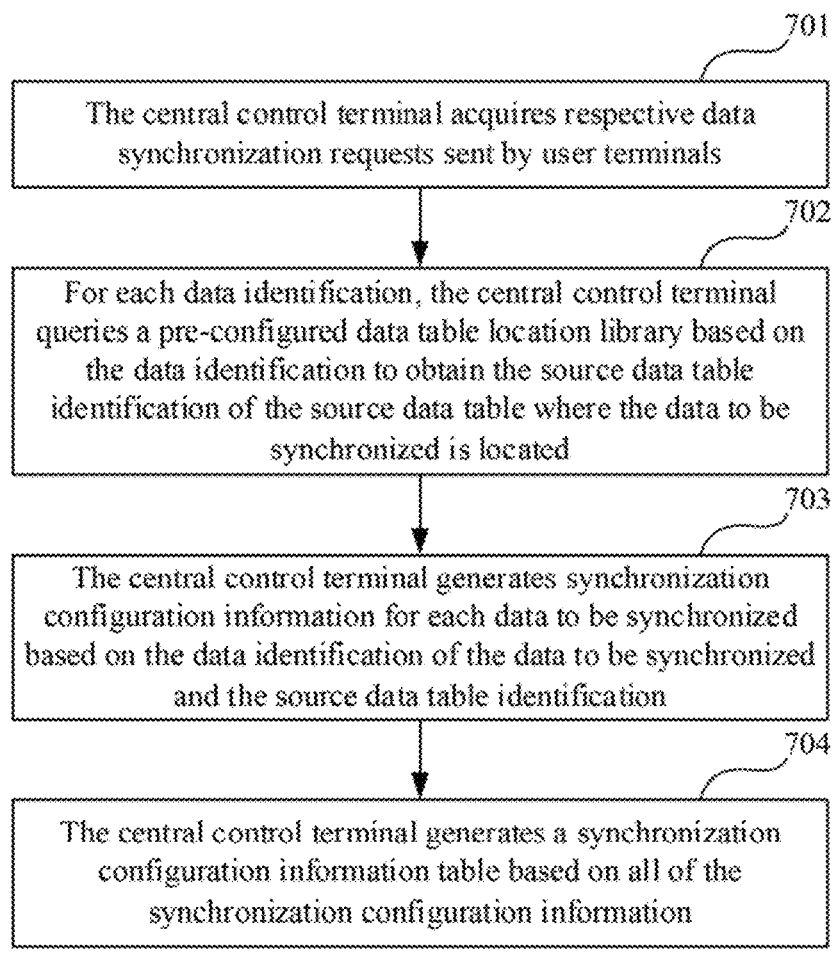
FIG. 7 is a flowchart of generating a synchronization configuration information table in a method for data synchronization in the present exemplary embodiment.

Referring to FIG. 7, in an optional embodiment of the present disclosure, before the central control terminal determines synchronization configuration information for data to be synchronized at operation 301, the method for data synchronization further includes operations 701 to 704.

At operation 701, the central control terminal acquires respective data synchronization requests sent by user terminals.

The data synchronization request at least includes data identification of the data to be synchronized, such as production data from May 22 to May 24 in the user terminal 1, so as to facilitate the central control terminal to query and determine a storage location corresponding to the data to be synchronized. The data synchronization request may also include a target location for data synchronization, for example, the data to be synchronized is synchronized into the target data table of the user terminal 3, and the target location may also be configured in advance, which is not limited in this embodiment.

At operation 702, the central control terminal queries a pre-configured data table location library based on the data identification to obtain respective source data table identification of the source data table where each of the data to be synchronized is located.

Different data types correspond to different data tables, and the central control terminal constructs and stores the data table location library based on correspondences between data identification and data tables. For example, in the following table 2, production data is stored in the production form, sales data is stored in the sales form, and office supplies consumption data is stored in the logistics form.

TABLE 2

| Serial number | Data identification | Source data table identification |
|---|---|---|
| 1 | Production data | Production form |
| 2 | Sales data | Sales form |
| 3 | Office supplies consumption data | Logistics form |
| . . . | . . . | . . . |

The central control terminal can quickly query based on the data identification, to obtain the source data of the data to be synchronized.

At operation 703, the central control terminal generates synchronization configuration information for the data to be synchronized based on the data identification of the data to be synchronized and the source data table identification.

The synchronization configuration information includes a data identification of the data to be synchronized and a source data table identification of the data table where the data to be synchronized is located. By analogy, the central control terminal generates synchronization configuration information corresponding to each piece of data to be synchronized in the same way.

At operation 704, the central control terminal generates a synchronization configuration information table based on all pieces of the synchronization configuration information.

The central control terminal generates a synchronization configuration information table based on all pieces of synchronization configuration information. As shown in the following table 3, the synchronization configuration information table contains synchronization configuration information corresponding to each piece of data to be synchronized.

TABLE 3

| 1 | The first piece of data to be synchronized | Configuration information 1 |
|---|---|---|
| 2 | The second piece of data to be synchronized | Configuration information 2 |
| 3 | The third piece of data to be synchronized | Configuration information 3 |
| . . . | . . . | . . . |

Subsequently, when adjusting the type, range, source table location, target location or the like of the data to be synchronized, only the configuration information corresponding to the data to be synchronized is adjusted, which is fast, efficient and flexible.

In an embodiment of the present disclosure, the operation 301 that the central control terminal determines the synchronization configuration information for the data to be synchronized includes the following operations.

The central control terminal queries the synchronization configuration information table based on the data identification of the data to be synchronized to obtain target synchronization configuration information corresponding to the data to be synchronized In the embodiment of the disclosure, after the synchronization configuration information table is constructed in advance at operation 704 above, if the same type of data need to be synchronized, the target synchronization configuration information can be acquired by only querying the synchronization configuration table while there is no need for configuring the synchronization configuration information again, which is more efficient, thereby improving the data synchronization efficiency in the embodiment of the disclosure.

Figure 8:
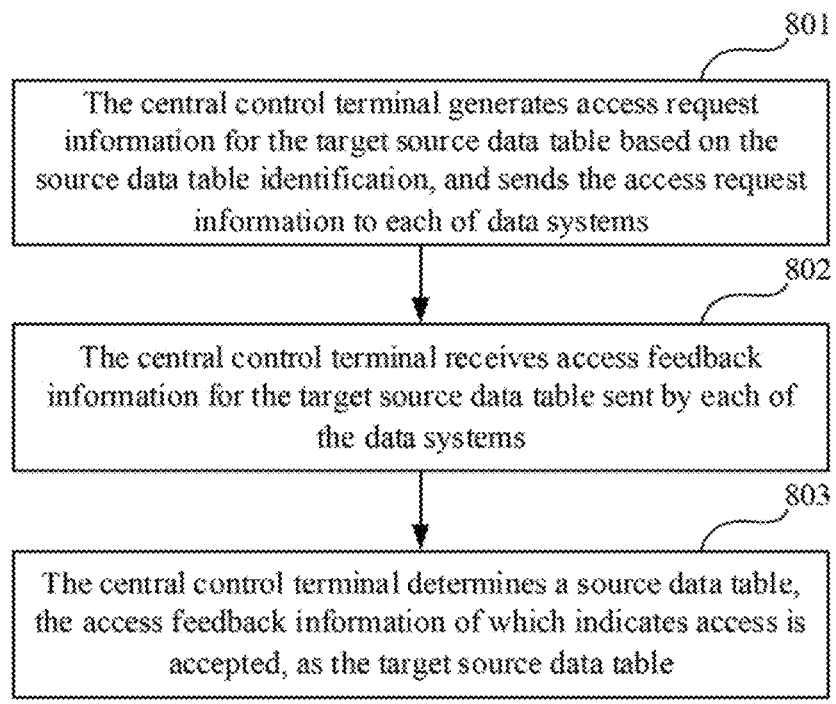
FIG. 8 is a flowchart of determining a target source data table in a method for data synchronization in the present exemplary embodiment.

Referring to FIG. 8, in an optional embodiment of the present disclosure, the operation 302 that the central control terminal queries a source database based on the source data table identification to obtain a target source data table where the data to be synchronized is located includes the following operations 801 to 803.

At operation 801, the central control terminal generates access request information for the target source data table based on the source data table identification, and sends the access request information to each of data systems.

For example, at operation 302 above, different source data tables are stored in different user terminals. For example, the source data table 1 is stored in the user terminal 1 corresponding to the production department, the source data table 2 is stored in the user terminal 2 corresponding to the operation and maintenance department. Each user terminal corresponds to a set of independently running data system, and the data generated during the operation of the data system is stored in a respective sub-database corresponding to the data system. The sub-databases in all of the data systems constitute the source database.

When the central control terminal needs to access the target source data table, the central control terminal generates access request information including the source data table identification, and broadcasts the access request information to various data systems, such as the production system, the operation and maintenance system and the logistics system.

At operation 802, the central control terminal receives access feedback information for the target source data table sent by each of the data systems.

After receiving the access request information broadcasted by the central control terminal, each of the data systems query to determine whether the target source data table corresponding to the access request information is stored in the data system. For example, the production data system includes three tables, it is determined by querying that the data table 2 matches the source data table identification in the access request information sent by the central control terminal, and the production system generates access feedback information indicating that access to the data table 2 is accepted and feeds the access feedback information back to the central control terminal.

At operation 803, the central control terminal determines a source data table, the access feedback information of which indicates the access to the source data table is accepted, as the target source data table.

At operation 802 above, the central control terminal can determine the data table 2 as the tartlet source data table.

In the embodiment of the present disclosure, the access request information for the target source data table is generated based on the source data table identification firstly, and the access request information is sent to each of data systems. The access feedback information is sent after the verification and confirmation of each data system, so as to improve the security of data in each data system and further improve the security of data synchronization provided by the embodiment of the present disclosure.

Figure 9:
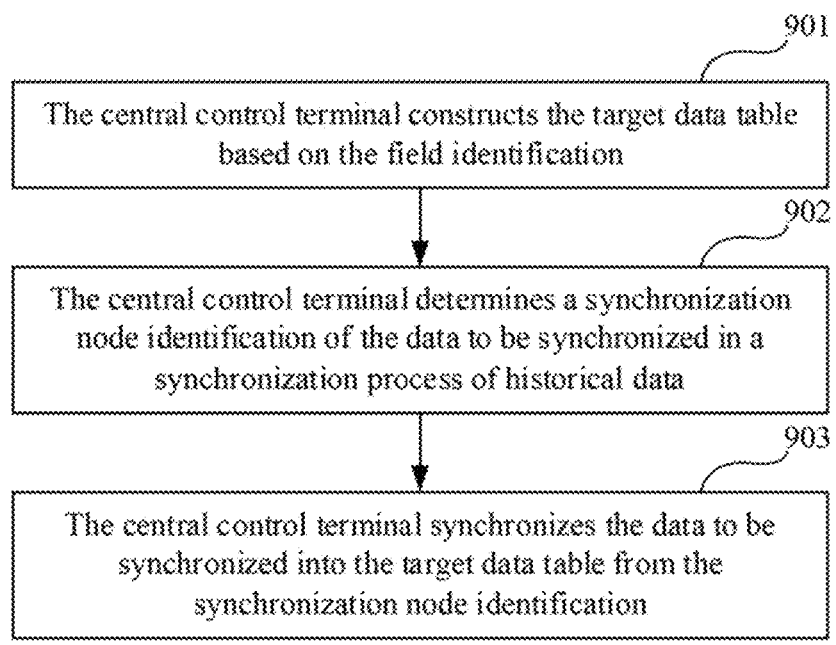
FIG. 9 is a flowchart of synchronizing data to be synchronized into a target data table according to a historical synchronization node in a method for data synchronization in the present exemplary embodiment.

Referring to FIG. 9, in an optional embodiment of the present disclosure, the operation 304 that the central control terminal constructs a target data table based on the field identification, and synchronizes the data to be synchronized into the target data table includes the following operations 901 to 903.

At operation 901, the central control terminal constructs the target data table based on the field identification.

The central control terminal may construct the target data table according to the same method as operation 304 above and will not be repeated here.

At operation 902, the central control terminal determines a synchronization node identification of the data to be synchronized in a synchronization process of historical data.

The synchronization node identification is used to identify a historical update node, that is, to identify a location synchronized in the synchronization of historical data, in this embodiment, the form of the synchronization node identification is not limited, and can be set according to the actual situation, such as date, line number, column number, etc. For example, the data in the field "Construction period" is updated to May 30 or the 32th row in the synchronization process of historical data.

At operation 903, the central control terminal synchronizes the data to be synchronized into the target data table from the synchronization node identification.

After a synchronization node identification corresponding to a historical synchronization node is determined at operation 902 above, the central control terminal synchronizes the data to be synchronized horn the synchronization node identification. For example, if the synchronization node identification at operation 802 is May 30 or the 32th row, the central control terminal continues synchronizing from May 31 or the 33th row, so as to ensure the order of the data, avoid the occurrence of repeated synchronization for the same data, and further improve the stability and reliability of the method for data synchronization provided by the embodiment of the present disclosure.

In an optional embodiment of the present disclosure, after the central control terminal synchronizes the data to be synchronized into the temporary data table in batches at operation 903, the method for data synchronization further includes the following operations.

The central control terminal performs data deduplication on data in the temporary data table.

For example, multiple pieces of production data on the same date, multiple pieces of yield data in the same batch, multiple pieces of data of the same product, etc. can be de-duplicated and deleted. For example, the primary data can be deleted and the latest data can be retained, to ensure the simplicity of the data in the temporary data table, and reduce the occupied memory of the temporary data table, thereby ensuring the smoothness and stability of the method for data synchronization provided by the embodiment of the present disclosure.

Figure 10:
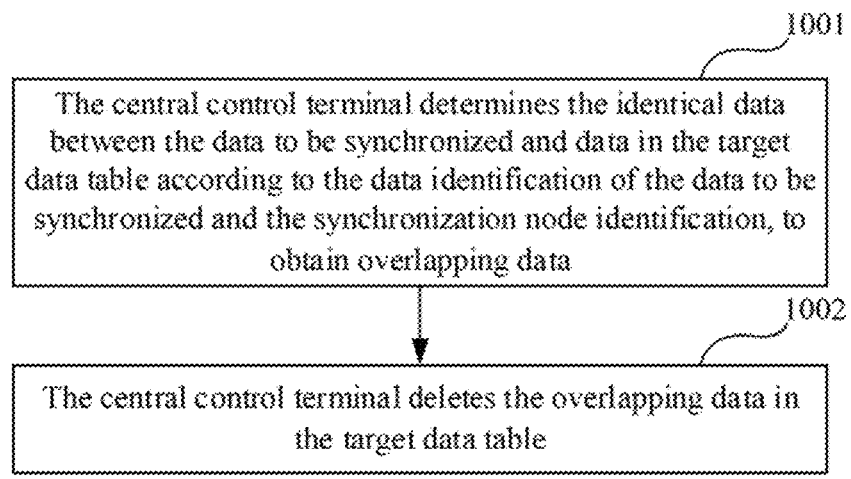
FIG. 10 is a flowchart of deleting overlapping data in a method for data synchronization in the present exemplary embodiment.

Referring to FIG. 10, in an embodiment of the present disclosure, the above operation that the control terminal performs deduplication on the data in the temporary data table includes the following operations 1001 to 1002.

At operation 1001, the central control terminal determines identical data between the data to be synchronized and data in the target data table according to the data identification of the data to be synchronized and the synchronization node identification, to obtain overlapping data.

For example, the synchronization node identification is May 30 at operation 802 above, which means that data in the target data table has been synchronized to May 30. If data identification of the data to be synchronized is from May 10 to June 9, there is partial overlapping between the data to be synchronized and the data in the target data table, that is, the data corresponding to May 10 to May 30 is overlapping data.

At operation 1002, the central control terminal deletes the overlapping data in the target data table.

Also in the example in operation 901 above, the central control terminal deletes the data corresponding to May 10 to May 30 in the target data table, so that the central control terminal can smoothly perform data synchronization. That is, the old data is replaced with the new data, thereby ensuring the stability of execution of data synchronization and timely updating the target data table.

Figure 11:
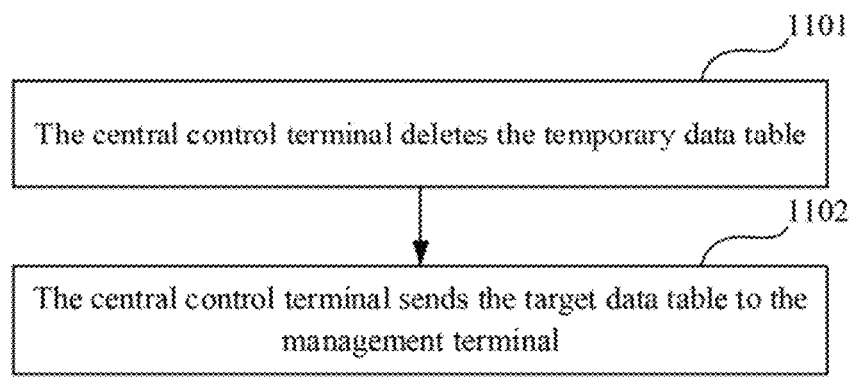
FIG. 11 is a flowchart of deleting a temporary data table and subsequent application processing of a target data table in a method for data synchronization in the present exemplary embodiment.

Referring to FIG. 11, in an optional embodiment of the present disclosure, after the operation 403 that the central control terminal generates a target data table based on the temporary data table, the method further includes operations 1101 to 1102.

At operation 1101, the central control terminal deletes the temporary data table.

The central control terminal deletes the temporary data table after generating the target data table, to release storage space, and thus provide more memory space for the execution of the method for data synchronization provided by the present disclosure, thereby further improving the stability of the execution of the method for data synchronization.

At operation 1102, the central control terminal sends the target data table to the management terminal.

After generating the target data table based on the temporary data tables, the central control terminal sends the obtained target data table to the management terminal to facilitate further distribution, analysis or processing by the management terminal, thereby improving the timeliness of data synchronization.

Figure 12:
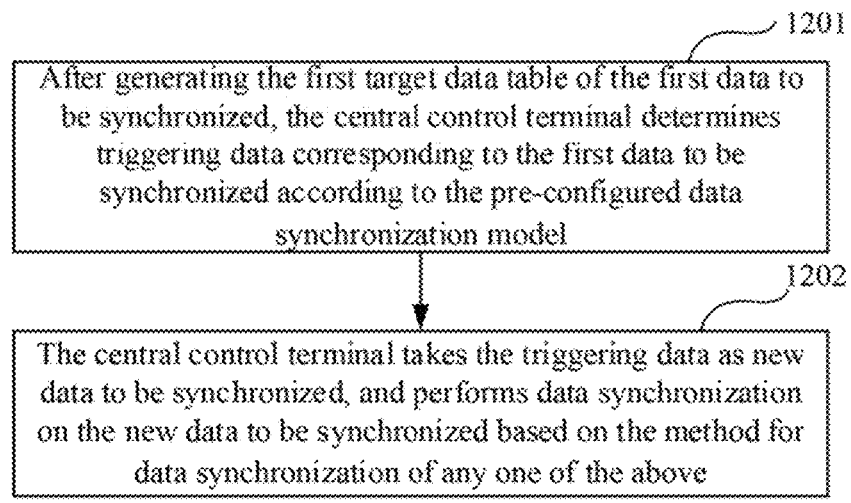
FIG. 12 is a flowchart of another method for data synchronization in the present exemplary embodiment.

Referring to FIG. 12, a method for data synchronization for synchronizing multiple sets of data to be synchronized is provided in another embodiment of the present disclosure, the method for data synchronization includes operations 1201 to 1202.

At operation 1201, after generating the first target data table of the first data to be synchronized, the central control terminal determines triggering data corresponding to the first data to be synchronized according to a pre-configured data synchronization model.

The data synchronization model is used to indicate a triggering order of multiple sets of data to be synchronized. That is, a triggering relationship between databases can be set through the data synchronization model. For example, when office supplies are dispensed, the office supplies are dispensed by the logistics department only after the approval of the administrative department. That is, data of the logistics department can be synchronized after first data to be synchronized in the administrative department is synchronized to generate the first target data table. Therefore, the data of the logistics department is triggering data corresponding to the data of the administrative department.

At operation 1202, the central control terminal takes the triggering data as new data to be synchronized, and performs data synchronization on the new data to be synchronized based on the method for data synchronization of any one of the above.

That is, the central control terminal takes the triggering data as new data to be synchronized, and continues synchronizing the new data to be synchronized based on ti above operations 301 to 304.

After generating a first target data table of first data to be synchronized, the triggering data corresponding to the first data to be synchronized is determined according to the pre-configured data synchronization model, and then the triggering data is continuously taken as new data to be synchronized to continue data synchronization, thereby improving the flexibility and application adaptability of data synchronization of the embodiment of the present disclosure.

Figure 13:
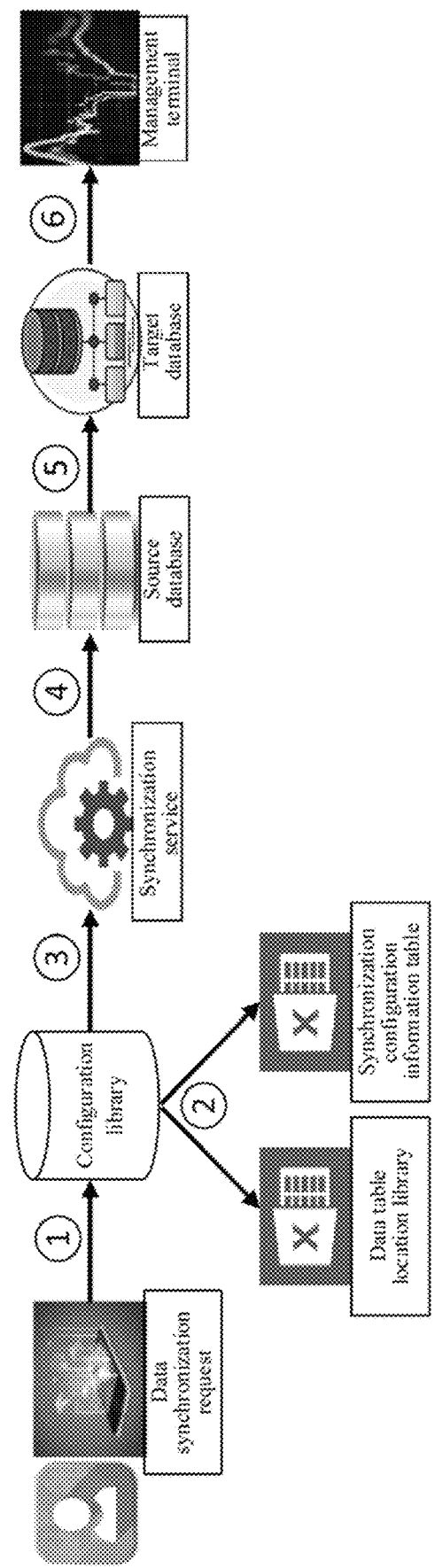
FIG. 13 is a flowchart of in a method for data synchronization in the preset exemplary embodiment.

Referring to FIG. 13, based on above optional embodiment, an interaction process of the method for data synchronization provided by the present disclosure includes the following operations.

1. The staff uploads a data synchronization request through a web page or a client of the system at each user terminal, 2. The central control terminal configures a data table location library of a source data table where each data to be synchronized is located. A management terminal for a synchronization configuration information table of each data to be synchronized generates synchronization configuration information based on each data synchronization request, and generates a synchronization configuration information table, and stores the data table location library and the synchronization configuration information table in an Extract-Transform-Load (ETL) configuration library, 3. The central control terminal retrieves the synchronization configuration information for the data to be synchronized from the synchronization configuration information table. 4. The central control terminal queries the source database based on the synchronization configuration information to obtain a target source data table of the data to be synchronized, and extracts field identification of the data to be synchronized. 5. The central control terminal constructs a temporary data table in the target database based on the field identification, and synchronizes the data to be synchronized into the temporary data table in batches, and generates the target data table after all the data synchronization is completed. 6. The target data table is synchronized into other analysis systems in the management terminal, so that the staff can further analyze and process the synchronized data.

Figure 14:
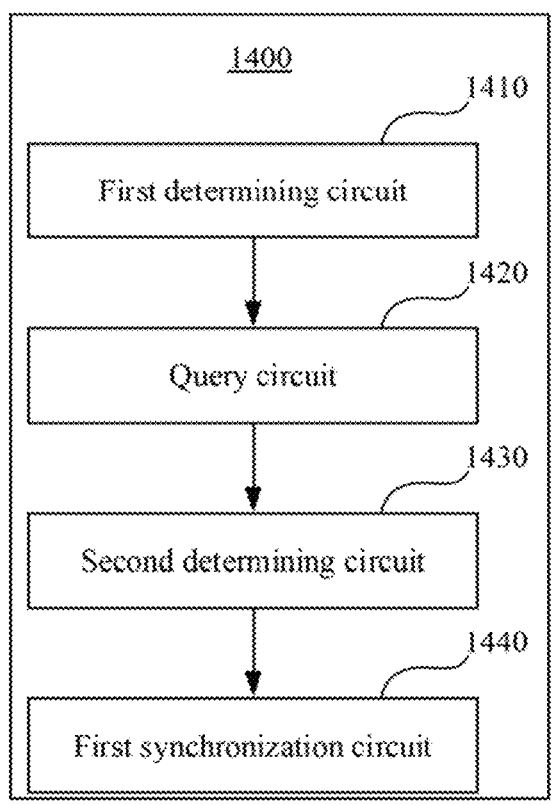
FIG. 14 is a schematic structural diagram of a device for data synchronization in the present exemplary embodiment.

Referring to FIG. 14, a device 1400 for data synchronization is provided in an embodiment of the present disclosure, in order to realize the above-mentioned service processing method. FIG. 14 is a schematic architecture diagram of the device 1400 for data synchronization, including a first determining circuit 1410, a query circuit 1420, a second determining circuit 1430 and a first synchronization circuit 1440.

The first determining circuit 1410 is configured to determine synchronization configuration information for data to be synchronized, and the synchronization configuration information at least includes a data identification of the data to be synchronized and a source data table identification of a source data table where the data to be synchronized is located.

The query circuit 1420 is configured to query a source database based on the source data table identification to obtain a target source data table where the data to be synchronized is located. The source database includes a plurality of source data tables.

The second determining circuit 1430 is configured to determine a field identification of the data to be synchronized from the target source data table based on the data identification.

The first synchronization circuit 1440 is configured to construct a target data table based on the field identification and synchronize the data to be synchronized into the target data table.

In an optional embodiment of the present disclosure, the first synchronization circuit 1440 is configured to construct a temporary data table based on the field identifications, synchronize the data to be synchronized into the temporary data table in batches, and if the temporary data table includes all of the data in the data to be synchronized, generate the target data table based on the temporary data table.

In an optional embodiment of the present disclosure, the first synchronization circuit 1440 is further configured to generate synchronization failure alarm information if at least one batch of data in the data to be synchronized fails to be synchronized into the target data table; and send the synchronization failure alarm information to the management terminal.

In an optional embodiment of the present disclosure, the first determining circuit 1410 is further configured to: acquire respective data synchronization requests sent by user terminals, and the data synchronization request at least includes a data identification of the data to be synchronized; for each of the data identification; query a pre-configured data table location library based on the data identification, to obtain the respective source data table identification of the source data table where the data to be synchronized is located; for each of the data to be synchronized, generate the synchronization configuration information for the data to be synchronized based on the data identification of the data to be synchronized and the source data table identification; and generate a synchronization configuration information table based on all of the synchronization configuration information. The synchronization configuration information table includes the synchronization configuration information corresponding to all of the data to be synchronized.

In an optional embodiment of the present disclosure, the first determining circuit 1410 is configured to query the synchronization configuration information table based on the data identification of the data to be synchronized, to obtain target synchronization configuration information corresponding to the data to be synchronized.

In an optional embodiment of the present disclosure, the query circuit 1420 is configured to generate access request information for the target source data table based on the source data table identification, and send the access request information to each of data systems, and sub-databases in all of the data systems constitute the source database; receive access feedback information for the target source data table sent by each of the data systems; and determine a source data table, the access feedback information of which indicates access to the source data table is accepted, as the target source data table.

In an optional embodiment of the present disclosure, the first synchronization circuit 1440 is configured to construct a target data table based on the field identifications, and determine a synchronization node identification of the data to be synchronized in a synchronization process of historical data, and synchronize the data to be synchronized into the target data table from the synchronization node identification.

In an optional embodiment of the present disclosure, the first synchronization circuit 1440 is further configured to perform data deduplication on the data in the temporary data table.

In an optional embodiment of the present disclosure, the first synchronization circuit 1440 is further configured to determine identical data between the data to be synchronized and data in the target data table according to the data identification of the data to be synchronized and the synchronization node identification, to obtain overlapping data; and delete the overlapping data in the target data table.

In an optional embodiment of the present disclosure, the first synchronization circuit 1440 is further configured to delete the temporary data table.

In an optional embodiment of the present disclosure, the first synchronization circuit 1440 is further configured to send the target data table to the management terminal.

Figure 15:
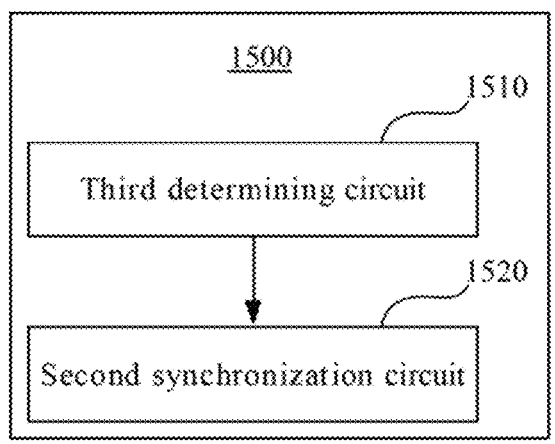
FIG. 15 is a schematic structural diagram of another device for data synchronization in the present exemplary embodiment.

Referring to FIG. 15, in order to realize the above service processing method, another device 1500 for data synchronization for synchronizing a plurality of sets of data to be synchronized is provided in another embodiment of the present disclosure. FIG. 15 is a schematic architecture diagram of the device 1500 for data synchronization including, a third determining circuit 1510 and a second synchronization circuit 1520.

The third determining circuit 1510 is configured to determine triggering data corresponding to the first data to be synchronized according to a pre-configured data synchronization model, after first target data table of first data to be synchronized is generated. The data synchronization model is configured to indicate a mutual triggering order among a plurality of sets of data to be synchronized.

The second synchronization circuit 1520 is configured to, with taking the triggering data as new data to be synchronized, perform data synchronization on the new data to be synchronized based on the method for data synchronization above.

In the exemplary embodiments of the present disclosure, a computer readable storage medium is provided. The computer readable storage medium may be implemented in the form of a program product including program code which, when the program product is run on the electronic device, causes the electronic device to perform the operations described in the above mentioned "exemplary methods" section of this specification according to various exemplary embodiments of the present disclosure. In an embodiment, the program product may be implemented as a portable compact disk read-only memory (CD-ROM) and includes program code, and may be run on an electronic device, such as a personal computer. However, the program product of the present disclosure is not limited to this. In this specification, the readable storage medium may be any tangible medium containing or storing a program, which may be used by or in combination with an instruction execution system, apparatus, or device.

The program product ma adopt any combination of one or more readable media. The readable medium may be a computer-readable signal medium or a readable storage medium. The readable storage medium may be, but is not limited to, electrical, magnetic, optical, electromagnetic, infrared, or semiconductor systems, apparatus or devices, or any combination of thereof. Specific examples (non-exhaustive list) of readable storage media include: an electrical connection having one or more conductors, a portable disk, a hard disk, a random access memory (RAM), a read-only memory (ROM), an erasable programmable read-only memory (EPROM or flash memory), an optical fiber, a portable compact disk read-only memory (CD-ROM), an optical memory device, a magnetic memory device, or any suitable combination of the above.

The computer-readable signal medium may include a data signal propagated in a baseband or as part of a carrier, in which readable program code is carried. Such propagated data signals may take many forms including but be not limited to electromagnetic signals, optical signals or any suitable combination of thereof. The readable signal medium may also be any readable medium other than a readable storage medium, which may transmit, propagate, or transmit a program for use by or in combination with an instruction execution system, apparatus, or device.

The program code included on the readable medium may be transmitted by any suitable medium, including, but be not limited to a wireless medium, a wired medium, an optical cable, RF, etc., or any suitable combination of therefore.

The program code for performing the operations of the present disclosure may be written in any combination of one or more programming languages. The programming languages include object-oriented programming languages such as Java, C++, and the like, as well as conventional procedural programming languages, such as "C" language or similar programming languages. The program code may be completely executed on the user computing device, partially executed on the user device, executed as a separate software package, partially executed on the user computing device and partially executed on the remote computing device, or completely executed on the remote computing device or server. In the case of a remote computing device, the remote computing device may be connected to a user computing device through any type of network, including a local area network (LAN) or a wide area network t WAN), or may be connected to an external computing device (e.g. through the Internet using an Internet service provider). In the embodiments of the present disclosure, the program code stored in the computer-readable storage medium, when being executed, implements any operation in the method for data synchronization as described above.

Figure 16:
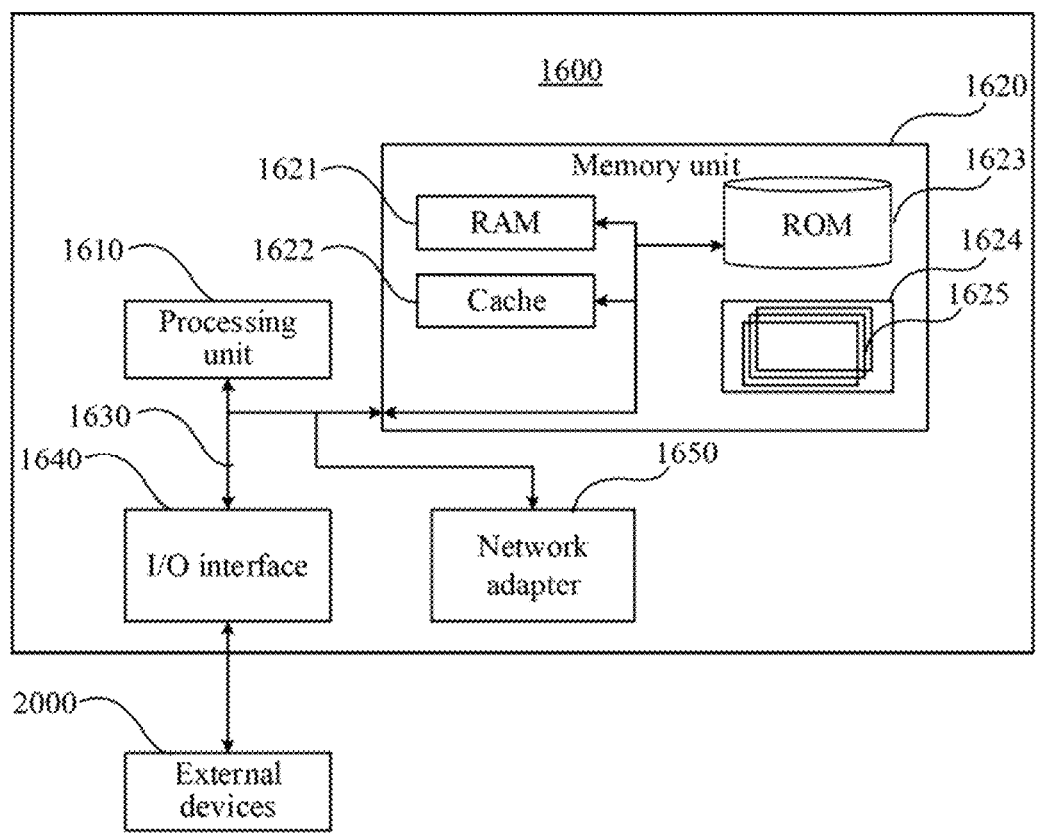
FIG. 16 is a schematic structural diagram of an electronic device in the present exemplary embodiment.

Referring to FIG. 16, an electronic device 1600 is further provided in the exemplary embodiment of the present disclosure, the electronic device can be a background server of an information platform. The electronic device 1600 is described below with reference to FIG. 16, It should be understood that in FIG. 16, the electronic device 1600 is merely an example and should not impose any limitation on the function and scope of use of the present disclosure.

As shown in FIG. 16, the electronic device 1600 is represented in the form of a general purpose computing device. Components of the electronic device 1600 may include, but are not limited to, at least one processing unit 1610, at least one storage unit 1620, and a bus 1630 connecting different system components (including the storage unit 1620 and the processing unit 1610).

The storage unit stores program code that can be executed by the processing unit 1610 to enable the processing unit 1610 to perform the operations described in the above-mentioned "exemplary methods" section of this specification according to the exemplary embodiments of the present disclosure. For example, the processing unit 1610 may perform operations and the like of the method as shown in FIG. 3.

The memory unit 1620 may include a volatile memory unit such as a random access memory unit (RAM) 1621 and/or a cache memory unit 1622, and may further include a read-only memory unit (ROM) 1623.

The memory unit 1620 may also include a program/utility 1624 having a set (at least one) of program modules 1625, which includes, but is not limited to, an operating system, one or more application programs, other program modules, and program data. Each or some combination of these examples may include an implementation of a network environment.

Bus 1530 may include a data bus, an address bus, and a control bus.

The electronic device 1600 may also communicate with one or more external devices 2000 (e.g. a keyboards, a pointing device, a Bluetooth device etc.), and such communication can be performed through an input/output (i/O) interface 1640. The electronic device 1600 may also communicate with one or more networks (e.g. a local area network (LAN), a wide area network (WAN) and/or a public network such as the Internet) through the network adapter 1650. As shown in FIG. 16, the network adapter 1650 communicates with other modules of the electronic device 1600 over the bus 1630. It should be understood that, although not shown, other hardware and/or software modules may be used in conjunction with electronic device 1600, including, but is not limited to, microcode, device drivers, redundant processing units, external disk drive arrays, RAID systems, tape drives, and data backup storage systems, etc.

In the embodiment of the present disclosure, any operation of the method for data synchronization as described above can be implemented when the program code stored in the electronic device is executed.

It should be noted that although several modules or units of the apparatus for action execution are described above in detail, the division is not mandatory: Indeed, according to the exemplary embodiments of the present disclosure, the features and functions of the two or more modules or units described above may be embodied in one module or unit. Conversely, the features and functions of one module or unit described above may be further divided into a plurality of modules or units.

Those skilled in the art will understand that the aspects of the present disclosure may be implemented as systems, methods or program products. Therefore, various aspects of the present disclosure can be implemented in the following forms: a complete hardware implementation, a complete software implementation (including firmware, microcode, etc.), or a combination of hardware and software, which can be collectively referred to as "circuit", "module" or "system", Other embodiments of the present disclosure will be apparent to those skilled in the art from consideration of the specification and practice of the present disclosure disclosed here. The present disclosure is intended to cover any variations, uses, or adaptations of the disclosure which conform to the general principles thereof and include common general knowledge and customary practice in the art which is not disclosed in the present disclosure. The specification and examples are merely exemplary, with a true scope and spirit of the disclosure being indicated by the following claims.

It should be understood that the present disclosure is not limited to the exact construction that has been described above and illustrated in the accompanying drawings, and that various modifications and changes may be made without departing from the scope thereof. The scope of the present disclosure is limited only by the appended claims.

The invention claimed is:

1. A method for data synchronization, comprising:
   determining synchronization configuration information for data to be synchronized, wherein the synchronization configuration information at least comprises a data identification of the data to be synchronized and a source data table identification of a source data table where the data to be synchronized is located;
   querying a source database based on the source data table identification to obtain a target source data table where the data to be synchronized is located, wherein the source database comprises a plurality of source data tables;
   determining a field identification of the data to be synchronized from the target source data table based on the data identification; and
   constructing a target data table based on the field identification, and synchronizing the data to be synchronized into the target data table;
   wherein the method further comprises:
   in response to at least one batch of data in the data to be synchronized fails to be synchronized into the target data table, generating synchronization failure alarm information; wherein, a threshold of the number of failures is set, and after one piece of data to be synchronized is failed to be synchronized, a restart mechanism is started to resynchronize again, and number of restarts are counted, and the synchronization failure alarm information is generated until the current number of failures is greater than or equal to the threshold of the number of failures; and
   sending the synchronization failure alarm information to a management terminal.

2. The method for data synchronization of claim 1, wherein the constructing the target data table based on the field identification and the synchronizing the data to be synchronized into the target data table comprises:
   constructing a temporary data table based on the field identification;
   synchronizing the data to be synchronized into the temporary data table in batches; and
   in response to that the temporary data table comprises all of the data to be synchronized, generating the target data table based on the temporary data table.

3. The method for data synchronization of claim 2, wherein the constructing the target data table based on the field identification and the synchronizing the data to be synchronized into the target data table comprises:
   constructing the target data table based on the field identification;
   determining a synchronization node identification of the data to be synchronized in a synchronization process of historical data; and
   synchronizing the data to be synchronized into the target data table from the synchronization node identification.

4. The method for data synchronization of claim 3, further comprising:
   after the synchronizing the data to be synchronized into the temporary data table in batches, performing data deduplication on data in the temporary data table.

5. The method for data synchronization of claim 4, wherein the performing the data deduplication on the data in the temporary data table comprises:
   determining identical data between the data to be synchronized and data in the target data table according to the data identification of the data to be synchronized and the synchronization node identification, to obtain overlapping data; and
   deleting the overlapping data in the target data table.

6. The method for data synchronization of claim 2, further comprising:
    after the generating the target data table based on the temporary data table, deleting the temporary data table.

7. The method for data synchronization of claim 1, further comprising: before the determining the synchronization configuration information for the data to be synchronized,
    acquiring respective data synchronization requests sent by user terminals, wherein the data synchronization request at least comprises the data identification of the data to be synchronized;
    for each of the data identification, querying a pre-configured data table location library based on the data identification, to obtain a respective source data table identification of the source data table where the data to be synchronized is located;
    for each of the data to be synchronized, generating the synchronization configuration information for the data to be synchronized based on the data identification of the data to be synchronized and the source data table identification; and
    generating a synchronization configuration information table based on all of the synchronization configuration information, wherein the synchronization configuration information table comprises the synchronization configuration information corresponding to all of the data to be synchronized.

8. The method for data synchronization of claim 7, wherein the determining synchronization configuration information for the data to be synchronized comprises:
    querying the synchronization configuration information table based on the data identification of the data to be synchronized, to obtain target synchronization configuration information corresponding to the data to be synchronized.

9. The method for data synchronization of claim 1, wherein the querying the source database based on the source data table identification to obtain the target source data table where the data to be synchronized is located comprises:
    generating access request information for the target source data table based on the source data table identification, and sending the access request information to each of data systems, wherein sub-databases in all of the data systems constitute the source database;
    receiving access feedback information for the target source data table sent by each of the data systems; and
    determining a source data table, the access feedback information of which indicates that access is accepted, as the target source data table.

10. The method for data synchronization of claim 1, further comprising:
    sending the target data table to a management terminal.

11. A method for data synchronization for synchronizing a plurality of sets of data to be synchronized, the method comprising:
    after a first target data table of first data to be synchronized is generated, determining triggering data corresponding to the first data to be synchronized according to a pre-configured data synchronization model, wherein the data synchronization model is configured to indicate a mutual triggering order of the plurality of sets of data to be synchronized; and
    with taking the triggering data as new data to be synchronized, performing data synchronization on the new data to be synchronized based on the method for data synchronization according to claim 1.

12. A device for data synchronization for synchronizing a plurality of sets of data to be synchronized, comprising:
    a third determining circuit configured to, after a first target data table of first data to be synchronized is generated, determine triggering data corresponding to the first data to be synchronized according to a pre-configured data synchronization model, wherein the data synchronization model is configured to indicate a mutual triggering order of the plurality of sets of data to be synchronized; and
    a second synchronization circuit configured to, with taking the triggering data as new data to be synchronized, perform data synchronization on the new data to be synchronized based on the method for data synchronization as claimed in claim 1.

13. A non-transitory computer-readable storage medium having stored thereon a computer program that, when being executed by a processor, implements the method of claim 1.

14. An electronic device comprising:
    a processor; and
    a memory for storing processor-executable instructions, wherein a processor is configured to perform the method of claim 1 by executing the executable instructions.

15. A device for data synchronization, comprising:
    a first determining circuit configured to determine synchronization configuration information for data to be synchronized, wherein the synchronization configuration information at least comprises a data identification of the data to be synchronized and a source data table identification of a source data table where the data to be synchronized is located;
    a query circuit configured to query a source database based on the source data table identification to obtain a target source data table where the data to be synchronized is located, wherein the source database comprises a plurality of source data tables;
    a second determining circuit configured to determine a field identification of the data to be synchronized from the target source data table based on the data identification; and
    a first synchronization circuit configured to construct a target data table based on the field identification and synchronize the data to be synchronized into the target data table;
    wherein the first synchronization circuit is further configured to:
    generate synchronization failure alarm information if at least one batch of data in the data to be synchronized fails to be synchronized into the target data table;
    send the synchronization failure alarm information to the management terminal; and
    set a threshold of the number of failures, and after one piece of data to be synchronized is failed to be synchronized, start a restart mechanism to resynchronize again, count number of restarts, and generate the synchronization failure alarm information until the current number of failures is greater than or equal to the threshold of the number of failures.

16. A method for data synchronization for synchronizing a plurality of sets of data to be synchronized, the method comprising:
    after a first target data table of first data to be synchronized is generated, determining triggering data corresponding to the first data to be synchronized according to a pre-configured data synchronization model, wherein the data synchronization model is configured to indicate a mutual triggering order of the plurality of sets of data to be synchronized; and with taking the triggering data as new data to be synchronized, performing data synchronization on the new data to be synchronized based on:

determining synchronization configuration information for the new data to be synchronized, wherein the synchronization configuration information at least comprises a data identification of the new data to be synchronized and a source data table identification of a source data table where the new data to be synchronized is located;

querying a source database based on the source data table identification to obtain a target source data table where the new data to be synchronized is located, wherein the source database comprises a plurality of source data tables;

determining a field identification of the data to be synchronized from the target source data table based on the data identification; and constructing a target data table based on the field identification, and synchronizing the data to be synchronized into the target data table.

17. The method for data synchronization of claim 16, wherein the constructing the target data table based on the field identification and the synchronizing the data to be synchronized into the target data table comprises:

constructing a temporary data table based on the field identification;

synchronizing the data to be synchronized into the temporary data table in batches; and in response to that the temporary data table comprises all of the data to be synchronized, generating the target data table based on the temporary data table.

18. The method for data synchronization of claim 17, further comprising:

in response to at least one batch of data in the data to be synchronized fails to be synchronized into the target data table, generating synchronization failure alarm information, and sending the synchronization failure alarm information to a management terminal.

19. The method for data synchronization of claim 16, further comprising:

before the determining the synchronization configuration information for the data to be synchronized, acquiring respective data synchronization requests sent by user terminals, wherein the data synchronization request at least comprises the data identification of the data to be synchronized;

for each of the data identification, querying a pre-configured data table location library based on the data identification, to obtain a respective source data table identification of the source data table where the data to be synchronized is located;

for each of the data to be synchronized, generating the synchronization configuration information for the data to be synchronized based on the data identification of the data to be synchronized and the source data table identification; and generating a synchronization configuration information table based on all of the synchronization configuration information, wherein the synchronization configuration information table comprises the synchronization configuration information corresponding to all of the data to be synchronized.

20. A device for data synchronization for synchronizing a plurality of sets of data to be synchronized, comprising:

a third determining circuit configured to, after a first target data table of first data to be synchronized is generated, determine triggering data corresponding to the first data to be synchronized according to a pre-configured data synchronization model, wherein the data synchronization model is configured to indicate a mutual triggering order of the plurality of sets of data to be synchronized; and a second synchronization circuit configured to, with taking the triggering data as new data to be synchronized, perform data synchronization on the new data to be synchronized based on the method for data synchronization according to claim 16.

* * * * *